United States Patent
Funk

(10) Patent No.: US 9,782,840 B2
(45) Date of Patent: Oct. 10, 2017

(54) SAFETY DRILLING TOOL

(71) Applicant: James Edwin Funk, Upland, CA (US)

(72) Inventor: James Edwin Funk, Upland, CA (US)

(*) Notice: Subject to any disclaimer, the term of this patent is extended or adjusted under 35 U.S.C. 154(b) by 159 days.

(21) Appl. No.: 14/789,983

(22) Filed: Jul. 1, 2015

(65) Prior Publication Data
US 2016/0001380 A1    Jan. 7, 2016

Related U.S. Application Data

(60) Provisional application No. 61/998,519, filed on Jul. 1, 2014.

(51) Int. Cl.
*B23B 51/04*   (2006.01)

(52) U.S. Cl.
CPC ...... *B23B 51/0453* (2013.01); *B23B 51/0426* (2013.01); *B23B 2251/28* (2013.01); *B23B 2251/408* (2013.01); *B23B 2251/60* (2013.01); *B23B 2260/12* (2013.01); *B23B 2260/122* (2013.01); *Y10T 408/895* (2015.01); *Y10T 408/8957* (2015.01)

(58) Field of Classification Search
CPC .................. B23B 51/0426; B23B 51/0453
See application file for complete search history.

(56) References Cited

U.S. PATENT DOCUMENTS

| | | | |
|---|---|---|---|
| 1,234,468 A * | 7/1917 | Hamilton | B23B 51/0426 408/112 |
| 1,958,828 A * | 5/1934 | Laughlin | B23B 13/125 279/20.1 |
| 2,053,702 A * | 9/1936 | Davis | B23B 51/0426 408/125 |
| 2,368,397 A * | 1/1945 | Allison | B24D 7/10 408/144 |
| 2,480,595 A * | 8/1949 | Moyer | B23B 51/0473 279/83 |
| 2,482,439 A * | 9/1949 | Smith | B23B 51/0426 144/23 |
| 3,153,885 A * | 10/1964 | Keller | B24D 7/10 125/20 |
| 4,632,610 A | 12/1986 | Hougen | |
| 5,082,403 A * | 1/1992 | Sutton | B23B 51/0453 408/204 |

(Continued)

FOREIGN PATENT DOCUMENTS

KR    2012039417 A   *   4/2012

*Primary Examiner* — Eric A Gates
(74) *Attorney, Agent, or Firm* — Loza & Loza, LLP; Heidi L. Eisenhut

(57) ABSTRACT

A safety drilling tool having a tapered drill bit that drills through materials, such as metal, without producing any torque or heat is provided. The safety drilling tool may provide safety for the operator of the tool while drilling or cutting into electrical/electronic enclosures, such as switchgear. The bit may include a smooth graduated cam on the cutting portion eliminate the usage of steps as is the conventional practice in the art. The drill bits may be different sizes to reduce the bulkiness for sake of convenience. The bits may have a one or more internal helical flutes for pushing the debris through the hole being drilled. The hole saw portion of the bit draws the material into the center of the bit until the initial hole is made allowing the debris from the tapered bit to flow through hole being drilled.

19 Claims, 4 Drawing Sheets

(56) References Cited

U.S. PATENT DOCUMENTS

| | | | |
|---|---|---|---|
| 5,108,235 A | 4/1992 | Czyzewski | |
| 5,791,837 A * | 8/1998 | Johnson | B23B 51/0453 |
| | | | 408/204 |
| 6,007,279 A | 12/1999 | Malone, Jr. | |
| 6,167,792 B1 | 1/2001 | Korb et al. | |
| 7,174,823 B2 | 2/2007 | Cranna | |
| 7,207,398 B2 | 4/2007 | Runia et al. | |
| 7,261,703 B2 | 8/2007 | Lampropoulos et al. | |
| 7,517,179 B2 * | 4/2009 | Miller | B23B 31/06 |
| | | | 192/93 C |
| 7,658,136 B2 | 2/2010 | Rompel et al. | |
| 8,434,976 B2 * | 5/2013 | Kelleher | B23B 51/0473 |
| | | | 279/141 |
| 2012/0230788 A1 * | 9/2012 | Bozic | B23B 51/0406 |
| | | | 408/209 |

\* cited by examiner

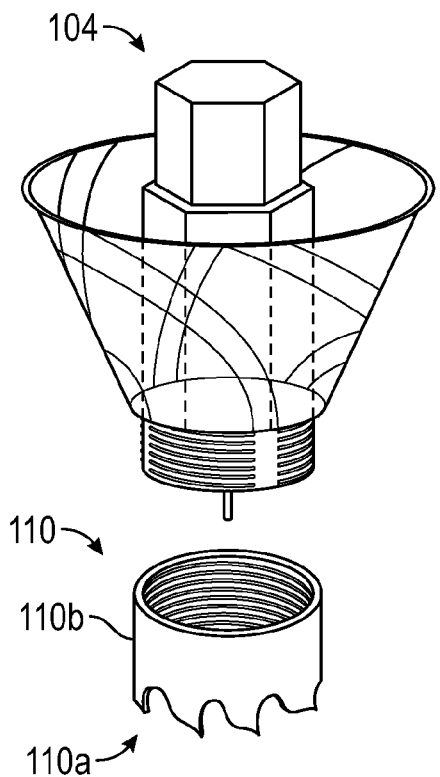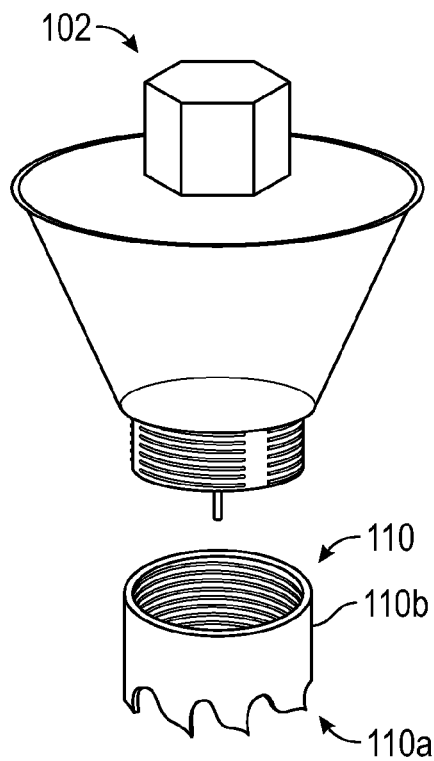
FIG. 13  FIG. 14
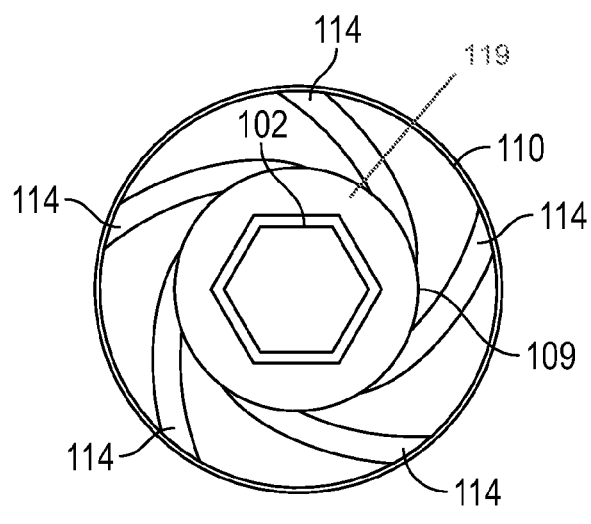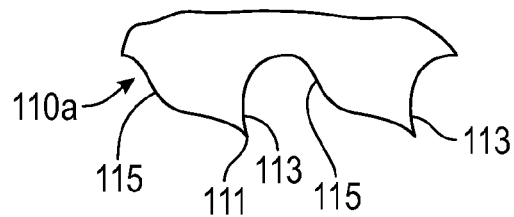
FIG. 15  FIG. 16

SAFETY DRILLING TOOL

CLAIM OF PRIORITY

The present application for patent claims priority to U.S. Provisional Application No. 61/998,519 entitled "Safety tool constructed of a tapered bit that drills thru metals without heat and torque, especially designed for electrical industry", filed Jul. 1, 2014, which is hereby expressly incorporated by reference.

FIELD

Various features relate to safety equipment for the electrical/electronics filed and more specifically to a safety drilling tool for drilling into live switchgear or other electrical equipment.

BACKGROUND

Electricians have been working on hot or live switchgear for many years. There are many instances, for example, hospitals, large factories and numerous businesses that require electricians to work and install equipment and conduits into live switchgear without de-energizing it first.

There has never been a safe and ideal way of installing conduits in hot or live switchgear without turning the electrical off at the source. The process of drilling into live or hot switchgear produces debris that is extremely hazardous to the operator, should any of debris accidentally fall inside a breaker or an electrical switch inside the switchgear, hence causing an explosion.

Usually, an operator will use a piece of cardboard or a rubber blanket to try to insulate the electrical components from the debris caused by drilling into the switchgear. Typically, this task is performed with a two-step approach: (1) a small hole is drilled by using a unibit to cut a hole about 1" in diameter; and (2) a hole punch is used to punch the appropriate sized hole to finish the task. The first step is very dangerous. If the shavings from the unibit fall into the live or hot components of the switchgear, an explosion may occur which can result in serious injury to the operator and at times can be fatal.

The practice of working on live or hot switchgear is not new, but has often made electricians uneasy. The very nature of the work of an electrician around live or hot switchgear is often a tense moment, especially when drilling holes into the metal housing of the switchgear. The act of cutting the hole, whether one uses a unibit or hole saw, is a large aspect of the task. Although cutting the hole might appear to be the most dangerous aspect of the task, the removal of the debris by means of a makeshift apparatus is just as hazardous, if not more. A make-shift apparatus is very difficult to make so as to limit the possibility of errors. Furthermore, no matter what type of apparatus one uses, the debris is never secured in a proper method for easy disposal.

Another challenge that is even greater is that of drilling into live or hot switchgear that has very limited space due to existing wiring that has been routed in such a way that it cannot be moved, or that has switchgear components that cannot be removed.

The operations of drilling into live or hot switchgear is not likely to diminish but, on the contrary, to grow more and more prevalent seeing how our present culture is more geared to optimum production and technology. With factories producing materials around the clock and technology growing at the fastest rate, shutting down switchgear to enable safe conditions is becoming less and less likely.

Due to the foregoing factors, only the very experienced electricians are called to perform these duties. When accidents occur, a very well trained and experienced trade man is lost and the explosion causes great cost and loss to the company, the contractor and the insurance companies.

The safety tool of this application would make this unsafe and hazardous operation, one of the safest operations that an electrician could perform around live or hot switchgear. This safety measure while providing an enhanced sense of security to the electrician would also ensure the business owner a peace of mind, knowing that all safety measures that are available are being used. This safety tool not only limits the possibility of danger during the act of drilling into the switchgear, but also assists in the removal of the debris and disposal of debris after the operation is over.

Based on the foregoing, there is a clear need for a safety tool for facilitating work on live or hot switchgear. Further, there is a specific need for such a safety tool that limits the danger associated with drilling into switchgear. There is a further need for such a safety tool that facilitates the simple and safe removal of debris during the drilling operation.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one feature a drilling tool is provided. The drilling tool includes an arbor assembly, a graduated cam, a plurality of internal helical flutes and a hole saw. The arbor assembly my include an elongated shank extending along a longitudinal shank axis, the elongated shank having a proximal shank end and a distal threaded shank end; a pilot bit extending along a longitudinal pilot-bit axis, the pilot bit being partly arranged within the elongated shank and projecting out of the distal shank end; and a circular plate extending horizontally from the proximal shank end of the elongated shank. The graduated cam may have have a proximal cam end, a distal cam end and an opening extending vertically through the graduated cam for receiving the arbor assembly. The plurality of internal helical flutes may be located within the graduated cam and extend helically from the proximal cam end to the distal cam end for receiving debris produced from drilling into a material. The hole saw may include a hollow cylindrical member having a cylindrical wall and a cutting edge, the cylindrical wall threadingly engaged with the distal threaded shank end; and a plurality of teeth on the cutting edge, the plurality of teeth comprising a plurality of repeating segments, each segment having a tip, a rake face adjacent the tip and a curvilinear base surface located on an opposite side of the rake face relative to the tip and where the curvilinear base surface extends in the cutting direction of the hole saw.

According to one aspect, the graduated cam has a cone shape and a smooth outer surface.

According to one aspect, each internal helical flute in the plurality of internal helical flutes may be separated by a same distance around the graduated cam. The number of internal flutes may be an odd number.

According to one aspect, a radius of the graduated cam decreases from the proximal shank end to the distal shank end.

BRIEF DESCRIPTION OF THE DRAWINGS

FIG. 13 illustrates a side elevation view of an arbor assembly located within a graduated cam of a safety drilling tool showing internal flutes, according to one aspect.

FIG. 14 illustrates a side elevation view of an arbor assembly located within a graduated cam of a safety drilling tool, according to one aspect.

FIG. 15 illustrates a top plan view of a safety drilling tool, according to one aspect.

FIG. 16 illustrates a close up view of a portion of teeth located on a hole saw, according to one aspect.

DETAILED DESCRIPTION

A safety tool for live electrical work, such as drilling into live electrical switchgear, is described. The following detailed description is of the best currently contemplated modes of carrying out the invention. The description is not to be taken in a limiting sense, but is made merely for the purpose of illustrating the general principles of the invention. Furthermore, in the following description, specific details are given to provide a thorough understanding of the embodiments. However, it will be understood by one of ordinary skill in the art that the embodiments may be practiced without these specific details.

Overview

The drilling tool described herein is a safety tool that is constructed of a tapered drill bit that drills through materials, such as metal, without producing any torque or heat as is produced with conventional drilling tools. The safety drilling tool of the present disclosure may provide safety for the operator of the tool while drilling or cutting into electrical/electronic enclosures, such as switchgear. The drilling tool may include a smooth graduated cam on the cutting portion to eliminate the usage of steps in the cam as is the conventional practice in the art. Different sized cams may be used to reduce the bulkiness for sake of convenience. The cam may have one or more internal helical flutes for pushing the debris through the hole being drilled. The hole saw portion of the tool draws the material into the center of the tool until the initial hole is made allowing the debris from the tapered bit to flow through hole being drilled. The tool may be formed from any material known in the art, including but not limited to tool steel, carbides, and cerbide. According to one aspect, the safety drilling tool may be forged into a singular piece or a plurality of pieces by means of molds and molding.

Safety Drilling Tool

Figure 1:
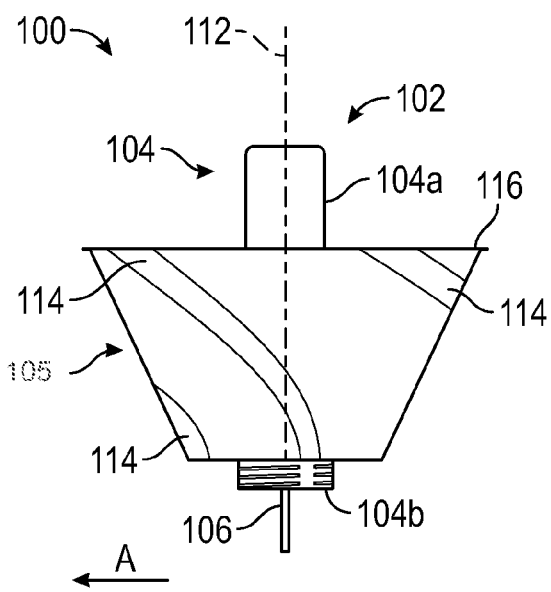
FIG. 1 illustrates a side elevation view of an arbor assembly located within a graduated cam of a safety drilling tool showing internal flutes, according to one aspect.
Figure 2:
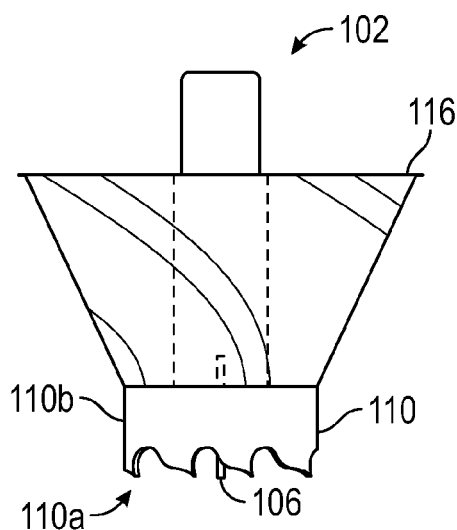
FIG. 2 illustrates a side elevation view of the safety drilling tool of FIG. 1 having a hole saw threadingly secured to the arbor assembly.

FIG. 1 illustrates a side elevation view of an arbor assembly 104 located within a graduated cam 105 of a safety drilling tool 100, according to one aspect. FIG. 2 illustrates a side elevation view of the safety drilling tool 100 of FIG. 1 having a hole saw 110 threadingly secured to the arbor assembly 102. Accordingly to one aspect, the hole saw 110 may be loosely secured to the arbor assembly 102 and not tightened so that the hole saw 110 may be easily removed.

Figure 6:
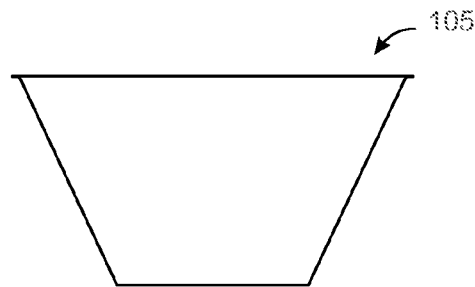
FIG. 6 illustrates a side elevation view of a modified cone shaped object used to form a graduated cam cone of a safety tool, according to one aspect.
Figure 11:
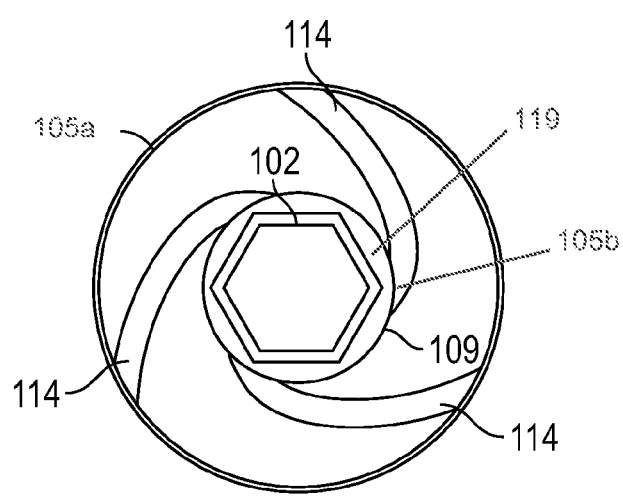
FIG. 11 illustrates a top plan view of a safety drilling tool, according to one aspect.

As shown, the graduated cam 105 may include an outer surface 105a and an inner surface 105b formed by an opening 119 (See FIGS. 11 and 15) extending from a proximal cam end to a distal cam end. The proximal cam end may have a circular configuration having a first circumference and the distal cam end may have a circular configuration having a second circumference where the first circumference is greater than the second circumference. That is, the circumference of the graduated cam 105 gradually decreases from the proximal cam end to the distal cam end forming a generally cone shaped configuration. (See FIG. 6) The graduated cam 105 may include a rim 116 so as to prevent the graduated cam 105 from going through the hole being drilled.

Figure 3:
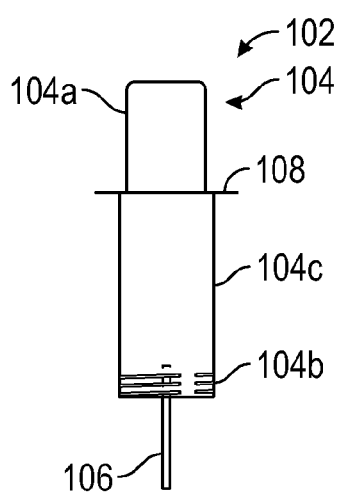
FIG. 3 illustrates a side elevation view of an arbor assembly, according to one aspect.

Turning to FIG. 3, a side elevation view of an arbor assembly 102 according to one aspect is shown. The arbor assembly 102 may include an elongated shank 104, a pilot bit 106 and a circular plate 108. The elongated shank may extend along a shank axis 112 and include a proximal shank end 104a, a distal shank end 104b and a center shank portion 104c located between the proximal shank end 104a and the distal shank end 104b. The pilot pit 106 may extend along a longitudinal pilot-bit axis located in the same vertical plane as the shank axis 112 and may be partly arranged within the elongated shank 104 and project out of the distal shank end 104b. The circular plate 108 may be located between the proximal shank end 104a and an upper end of the center shank portion 104c and may act as a stop so that the arbor assembly 102 will be inserted to the proper depth of the opening 109 of the graduated cam 105.

According to one aspect, the elongated shank 104 may have a generally hexagonal configuration or cross section. The hexagonal shape of the elongate shank 104 prevents the arbor assembly 104 from slipping or rotating when inserted into the opening 119 of the graduated cam 105 and the drilling tool is in use. Alternatively, the elongated shank 104 may have any other configuration as is known in the art.

Figure 4:
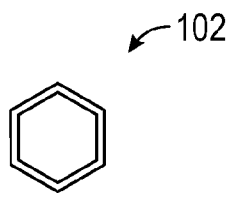
FIG. 4 illustrates a top plan view of an elongated member of the arbor assembly of FIG. 3.

FIG. 4 illustrates a top plan view of the elongated shank 104 of the arbor assembly 102.

Figure 5:
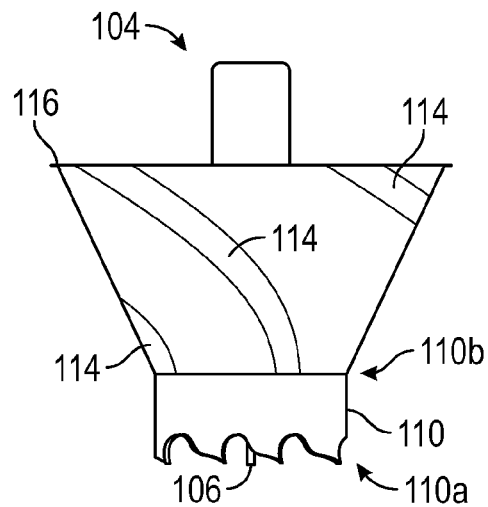
FIG. 5 an arbor assembly located within a graduated cam of a safety drilling tool showing internal flutes and a hole saw.

The safety drilling tool 100 may further include a hole saw 110 adapted to secured to the distal shank end 104 of the elongated shank 104 of the arbor assembly 102. FIG. 5 illustrates a side elevation view of the hole saw 110 secured to the distal end 104b of the arbor assembly 104 in the graduated came 105. The hole saw 110 may include a hollow cylindrical member having a cylindrical wall 110b and a cutting edge 110a. The internal surface of the cylindrical wall 110b may be threaded allowing the hole saw 110 to be threadingly engaged with the distal shank end 104b of the elongated shank 104 of the arbor assembly 102. The threads on the distal shank end 104b and the threads on the inner surface of the cylindrical wall 110b may be tri-threads such as may be found on a soft drink bottle.

Figure 7:
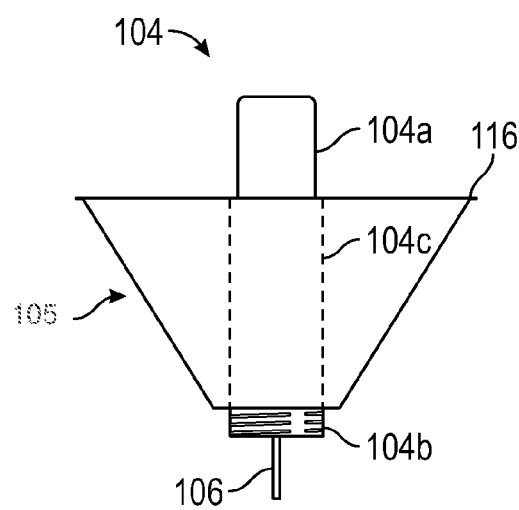
FIG. 7 illustrates a side elevation view of an arbor assembly located within a graduated cam of a safety drilling tool, according to one aspect
Figure 8:
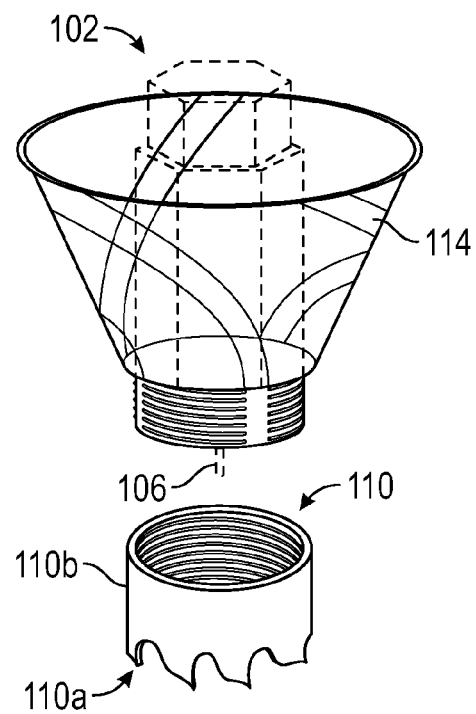
FIG. 8 illustrates a side elevation view of an arbor assembly located within a graduated cam of a safety drilling tool showing internal flutes, according to one aspect.
Figure 9:
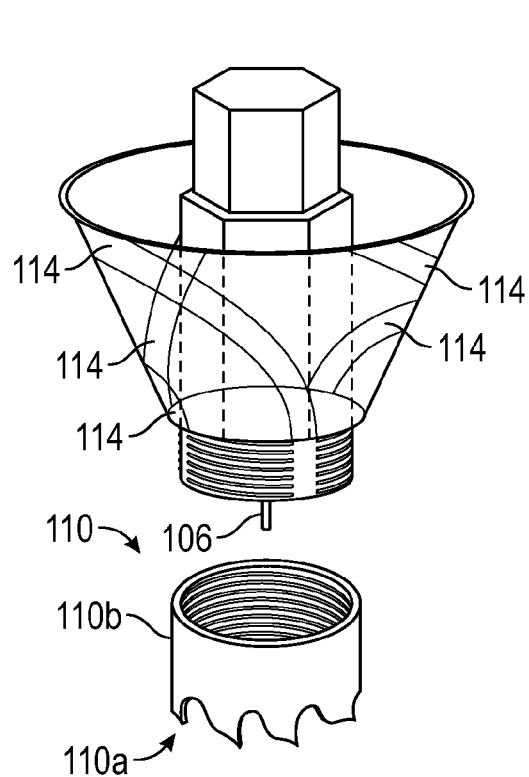
FIG. 9 illustrates a side elevation view of an arbor assembly located within a graduated cam of a safety drilling tool showing internal flutes, according to one aspect.
Figure 10:
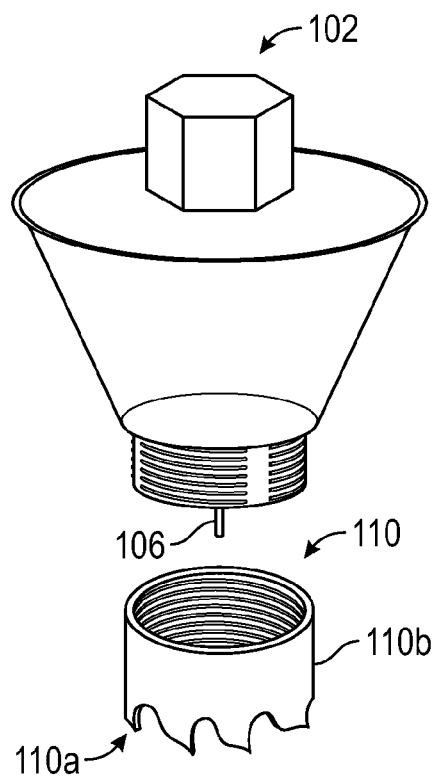
FIG. 10 illustrates a side elevation view of an arbor assembly located within a graduated cam of a safety drilling tool, according to one aspect.

FIG. 7 illustrates a side elevation view of the arbor assembly 104 inserted within the graduated cam 105 showing the tri-threads on the distal end 104 of the arbor assembly 104. FIGS. 8 and 9 illustrates a side elevation view of the arbor assembly 104 inserted within the graduated cam 105 and the hole saw 100 detached from the distal end 104 of the arbor assembly 104 showing the tri-threads on the arbor assembly 104 and on the inner surface of the hole saw 110. For clarity, FIGS. 8 and 9 fail to show the circular plate 108 of the arbor assembly 104 and the details of tools as shown in the top plan view of FIG. 11. FIG. 10 illustrates a side elevation view of the arbor assembly 104 located within the graduated cam 104 of the safety drilling tool 100. For clarity, FIG. 10 fails to show the circular plate 108 of the arbor assembly 104 and the details of tool as shown in the top plan view of FIG. 11.

The cutting edge 110a of the hole saw may include a plurality of teeth. The plurality of teeth may be comprised of a plurality of repeating segments where each segment includes a tip 111, a rake face 113 adjacent the tip 111 and a curvilinear base surface 115 located on an opposite side of the rake face 113 relative to the tip 111. FIG. 16 illustrates a close up view of a portion of two segments in the plurality of teeth located on the hole saw 110. According to one embodiment, the hole saw 100 may include eight (8) teeth or segments or may include more than eight (8) or less than eight (8) teeth or segments. The curvilinear base surface 115 of each segment extends in the cutting direction (See FIG. 1 reference arrow A) of the hole saw 110 which is the opposite of conventional hole saws where the curvilinear base surface extends in a direction opposite the cutting direction. By the curvilinear base surface 115 extending in the same direction as the cutting direction, the debris produced by drilling into the switch gear, or other material, is drawn into the center of the bit until the hole is produced. In conventional drilling tools where the curvilinear base surface extends in a direction opposite the cutting direction, the debris is pushed outward which is extremely hazardous to the operator as the debris may accidentally fall inside a breaker or an electrical switch inside the switchgear causing an explosion. Thus, the safety drilling tool 100 of the present disclosure prevents debris from being pushed outward by the curvilinear base surface extending in a direction that is the same as the cutting direction.

The safety drilling tool 100 may further include one or more internal flutes 114 which may be located between the outer surface and the inner surface of the graduated cam and extend from the distal cam end to the proximal cam end. The one or more internal flutes 114 may be in the form of channels which are used to transport the debris away from the cutting edges and out of the hole being drilled. As can be seen in FIG. 1 for example, the bottom ends of the internal flutes may align with vertical spaces located in the tri-threads so that the debris can be transported into the internal flutes 114.

According to one aspect, an odd number of flutes may be utilized and each flute may be equally spaced apart. A graduated cam 105 having three (3) internal flutes 114 is illustrated in FIGS. 1, 2, 5, 8, 9 and 11 while FIGS. 12, 13, 14 and 15 illustrate a graduated cam 105 having five (5) internal flutes 114. The internal flutes 114 may have a generally helical configuration had have a 5 degree helix at the distal cam end.

Figure 12:
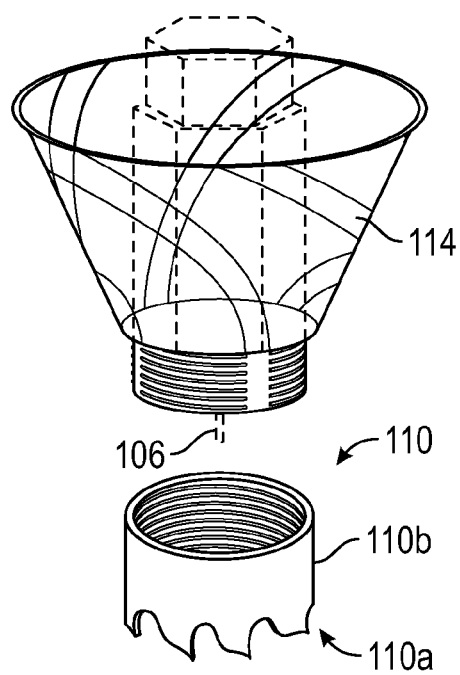
FIG. 12 illustrates a side elevation view of an arbor assembly located within a graduated cam of a safety drilling tool showing internal flutes, according to one aspect.

FIGS. 12-14 illustrate various side elevation views of the arbor assembly 104 located within the graduated cam 104 of the safety drilling tool 100. For clarity, FIGS. 12-14 fail to show the circular plate 108 of the arbor assembly 104 and the details of tool as shown in the top plan view of FIG. 15.

In addition to safely containing the debris produced when drilling by pushing it through the hole it cuts, the safety drilling tool of the present disclosure include the following advantages over the prior art:
1. No heat or torque is creating when drilling holes.
2. Can be used anywhere and for any operation.
3. Drills larger holes than any existing unibit products in market.
4. Drills more precise holes than any other hole cutter on market.
5. Clean up is non-existent.
6. It is the safest unibit type tool on market.
7. Easy and convenient to carry and use as compared to various tools or much heavier tools as knock-out sets.
8. Drill holes from ½" to 2' conduit (actual size approximately ¾"-2½'.
9. Less expensive and has longer durability.

One or more of the components and functions illustrated in FIGS. 1-16 may be rearranged and/or combined into a single component or embodied in several components without departing from the invention. Additional elements or components may also be added without departing from the invention.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

The invention claimed is:
1. A drilling tool, comprising:
an arbor assembly, the arbor assembly comprising:
an elongated shank extending along a longitudinal shank axis, the elongated shank having a proximal shank end and a distal threaded shank end;
a pilot bit extending along a longitudinal pilot-bit axis, the pilot bit being partly arranged within the elongated shank and projecting out of the distal shank end; and
a circular plate extending horizontally from the proximal shank end of the elongated shank;
a graduated cam having a proximal cam end, a distal cam end and an opening extending vertically through the graduated cam for receiving the arbor assembly, the proximal cam end has a circular configuration having a first circumference and the distal cam end has a circular configuration having a second circumference where the first circumference is greater than the second circumference;
a plurality of internal helical flutes located within the graduated cam and extending helically from the proximal cam end to the distal cam end for receiving debris produced from drilling into a material; and
a hole saw comprising:
a hollow cylindrical member having a cylindrical wall and a cutting edge, the cylindrical wall threadingly engaged with the distal threaded shank end; and
a plurality of teeth on the cutting edge, the plurality of teeth comprising a plurality of repeating segments, each segment having a tip, a rake face adjacent the tip and a curvilinear base surface located on an opposite side of the rake face relative to the tip and where the curvilinear base surface extends in the cutting direction of the hole saw.

2. The drilling tool of claim 1, wherein the graduated cam has a cone shape.

3. The drilling tool of claim 1, wherein an outer surface of the graduated cam is smooth.

4. The drilling tool of claim 1, wherein the elongated shank has a hexagonal cross section.

5. The drilling tool of claim 1, wherein the each helical flute in the plurality of helical flutes is separated by a same distance around the graduated cam.

6. The drilling tool of claim 5, wherein the plurality of helical flutes is an odd number.

7. The drilling tool of claim 1 wherein the graduated cam further includes a rim integrally connected to and extending perpendicularly outward from the first circumference and adapted to prevent the graduated cam from passing through a hole being drilled.

8. The drilling tool of claim 1, wherein the opening of the graduated cam is formed by an outer surface of the graduated cam and an inner surface of the graduated cam, both of which extend from the proximal cam end to the distal cam end.

9. The drilling tool of claim 1, wherein the plurality of inner flutes are located between the outer surface and the inner surface of the graduated cam.

10. The drilling tool of claim 1, wherein the plurality of teeth include eight segments.

11. The drilling tool of claim 1, wherein the curvilinear base surface extending in the cutting direction of the hole saw causing debris created from drilling a hole to be pull into the plurality of internal flutes.

12. A drilling tool, comprising:
an arbor assembly, the arbor assembly comprising:
an elongated shank extending along a longitudinal shank axis, the elongated shank having a proximal shank end, a distal shank end and a hexagonal cross section;
a pilot bit extending along a longitudinal pilot-bit axis, the pilot bit being partly arranged within the elongated shank and projecting out of the distal shank end; and
a circular plate extending horizontally from the proximal shank end of the elongated shank;
a graduated cone shaped cam having a proximal cam end, a distal threaded cam end, a smooth outer surface and an opening extending vertically through the graduated cone shaped cam for receiving the arbor assembly, the circular plate on the elongated shank adapted to stop the elongated shank in a proper location in the graduated cone shaped cam;
a plurality of internal flutes extending helically from the proximal cam end to the threaded cam end for receiving debris produced from drilling into a material; and
a hole saw comprising:
a hollow cylindrical member having a cylindrical wall and a cutting edge, the cylindrical wall threadingly engaged with the distal threaded shank end; and
a plurality of teeth on the cutting edge, the plurality of teeth comprising a plurality of repeating segments, each segment having a tip, a rake face adjacent the tip and a curvilinear base surface located on an opposite side of the rake face relative to the tip and where the curvilinear base surface extends in the cutting direction of the hole saw.

13. The drilling tool of claim 12, wherein the proximal cam end has a circular configuration having a first circumference; wherein the distal cam end has a circular configuration having a second circumference where the first circumference is greater than the second circumference.

14. The drilling tool of claim 13, wherein the graduated cam further includes a rim integrally connected to and extending perpendicularly outward from the first circumference and adapted to prevent the graduated cam from passing through a hole being drilled.

15. The drilling tool of claim 12, wherein the opening of the graduated cam is formed by an outer surface of the graduated cam and an inner surface of the graduated both of which extend from the proximal cam end to the distal cam end.

16. The drilling tool of claim 12, wherein the plurality of inner flutes are located between the outer surface and the inner surface of the graduated cam.

17. The drilling tool of claim 12, wherein the plurality of teeth include eight segments.

18. The drilling tool of claim 12, wherein the curvilinear base surface extending in the cutting direction of the hole saw causing debris created from drilling a hole to be pull into the plurality of internal flutes.

19. The drilling tool of claim 12, wherein the each helical flute in the plurality of helical flutes is separated by a same distance around the graduated cam.

* * * * *